(12) United States Patent  
Humphrey et al.

(10) Patent No.: US 10,169,858 B2  
(45) Date of Patent: Jan. 1, 2019

(54) SYSTEM AND METHOD FOR AUTOMATED COSMETIC INSPECTION OF ELECTRONIC DEVICES

(71) Applicant: ATC Logistics & Electronics, Inc., Fort Worth, TX (US)

(72) Inventors: Clark Humphrey, Fort Worth, TX (US); Brian Morris, Fort Worth, TX (US)

(73) Assignee: FedEx Supply Chain Logistics & Electronics, Inc., Fort Worth, TX (US)

( * ) Notice: Subject to any disclaimer, the term of this patent is extended or adjusted under 35 U.S.C. 154(b) by 512 days.

(21) Appl. No.: 14/204,731

(22) Filed: Mar. 11, 2014

(65) Prior Publication Data

US 2014/0267691 A1     Sep. 18, 2014

Related U.S. Application Data

(60) Provisional application No. 61/777,943, filed on Mar. 12, 2013.

(51) Int. Cl.  
*G06T 7/00* (2017.01)

(52) U.S. Cl.  
CPC ............ *G06T 7/001* (2013.01); *G06T 7/0008* (2013.01); *G06T 2207/30164* (2013.01)

(58) Field of Classification Search  
CPC .... G06Q 10/20; G06Q 10/30; G06Q 30/0278; G06Q 30/0237; Y02W 90/20;

(Continued)

(56) References Cited

U.S. PATENT DOCUMENTS 7,881,965 B2 *   2/2011   Bowles .................. G06Q 10/30  
                                                                    705/1.1  
8,867,817 B1 *  10/2014   Cooper .............. G01N 21/8851  
                                                                    382/141

(Continued)

OTHER PUBLICATIONS

"Mobile Phone Insurance Coverage." Mobile Phone Pulse. N.p., Oct. 11, 2007. Web. Jun. 20, 2016.*

(Continued)

*Primary Examiner* — Chan S Park  
*Assistant Examiner* — Geoffrey E Summers  
(74) *Attorney, Agent, or Firm* — McGuireWoods LLP

(57) ABSTRACT

A system, device, and method for inspecting the cosmetic and operational features of electronic devices, including computing and telecommunications devices. The cosmetic inspection system includes an image capture unit for capturing the images of the electronic devices, and a user interface for processing the captured images and providing relevant information to the user of the system. Images of the external components such as external casing materials or touch screens of electronic devices are captured and the cosmetic inspection system uses baseline images to make determinations to identify defective components of the electronic devices. Based on these determinations, the system may conclude which, if any, replacement components of the devices are needed to restore the electronic device. In one embodiment, a user of the system may then be provided with information through a user interface about defective components and options for ordering replacement components.

9 Claims, 6 Drawing Sheets

(58) Field of Classification Search
CPC ....... Y02W 30/826; Y02W 30/82; G07F 7/06; H04M 1/24; G06T 7/0002; G06T 7/0004; G06T 7/0008; G06T 7/001; G06T 2207/30164
USPC .......................................... 382/153, 141, 152
See application file for complete search history.

(56) References Cited

U.S. PATENT DOCUMENTS

| | | | | |
|---|---|---|---|---|
| 2002/0128790 | A1* | 9/2002 | Woodmansee | B23P 6/002 702/81 |
| 2008/0281691 | A1* | 11/2008 | Pearson | G06Q 30/02 705/14.34 |
| 2013/0046699 | A1* | 2/2013 | Bowles | G06Q 10/00 705/306 |
| 2013/0157641 | A1* | 6/2013 | Brahami | G07F 17/40 455/418 |
| 2014/0133736 | A1* | 5/2014 | Tien | G06T 7/001 382/149 |

OTHER PUBLICATIONS

Pauli, Josef, Arne Schmidt, and Gerald Sommer. "Vision-based integrated system for object inspection and handling." Robotics and Autonomous Systems 37.4 (2001): 297-309.*

Geyer, Roland, and Vered Doctori Blass. "The economics of cell phone reuse and recycling." The International Journal of Advanced Manufacturing Technology 47.5-8 (2010): 515-525.*

Krainin, Michael, et al. "Manipulator and object tracking for in-hand 3D object modeling." The International Journal of Robotics Research 30.11 (2011): 1311-1327. (Year: 2011).*

* cited by examiner

SYSTEM AND METHOD FOR AUTOMATED COSMETIC INSPECTION OF ELECTRONIC DEVICES

CROSS-REFERENCE TO RELATED APPLICATION

This application claims priority to U.S. Provisional Patent Application Ser. No. 61/777,943 filed on Mar. 12, 2013 entitled SYSTEM AND METHOD FOR AUTOMATED COSMETIC INSPECTION the entire teachings of which are incorporated herein.

BACKGROUND

The use of electronic devices has grown significantly in recent years. Along with this growth comes an increased number of devices with cosmetic defects being sent back to manufacturers for repairs or to be refurbished for redistribution. Defective devices may include those that have cosmetic defects, such as components that are cracked, shattered, warped, malfunctioning, scratched, missing, or any other type of damage that may occur to the exterior of such devices. Components may include any part of the device that is included according to the manufacturers' device specifications, including but not limited to external casing materials, displays, buttons, scroll wheels, input and output ports, microphones, speakers, cameras, protective covers, battery compartment covers, keyboards, and so forth. Processing such defective devices still requires significant amount of human interaction and effort, which is costly and does not maximize efficiency. Consequently, there is a need for more automated processing techniques to reduce the need for human involvement.

When a consumer reports that an electronic device, such as a cell phone, personal digital assistant (PDA), e-Book, tablet, or TV set-top box, is broken and returns it to a supplier, the device is often sent back to the manufacturer or designated handler of defective devices. In many cases, an inspector must then manually inspect the electronic device to determine any damaged or defective parts. The inspector then often makes the recommendation to order particular replacement parts for the device or decides that the device is irreparable and a replacement is required. Given the time required for an inspector to manually inspect the electronic device for defective parts and then look up replacement parts to restore the device, the number of devices an inspector may process for a given period of work time is restricted.

SUMMARY

One embodiment provides a system and method for inspecting the external components of electronic devices. The system may be used for identifying any external components of an electronic device that are defective or in need of replacement. The inspection system includes an image capture unit and a user interface. The system begins inspection by using the image capture unit to capture images of the exterior surfaces and components of the electronic device. The system then compares the captured images to a set of baseline images, which depict components according to manufacturers' specifications to determine if there are any defective components on the electronic device. The system then provides information regarding defective components to the user through the user interface of the inspection system. The system may also provide the user with information related to ordering replacement parts for the electronic device.

Another embodiment provides a system and method for inspecting the external components of electronic devices. The inspection system may be partially or fully automated to perform the imaging and comparison process with limited user interaction beyond the initial set-up. Once the user has attached the electronic device to the image capture unit, the system may automatically identify the type of electronic device and based on this identity, automatically capture the necessary images of the electronic device. The system performs the comparison of the captured images to the baseline images to identify any defective components. The system may further automatically place an order for any replacement components needed based on any defective components the system has identified.

Another embodiment provides a cosmetic inspection device configured to both capture images of an electronic device and identify defective components for displaying to the user. The cosmetic inspection device comprises an image capture unit configured to capture images of an electronic device and a user interface configured to control the image capture. The cosmetic inspection device is also configured to compare baseline images and determine defective components. The cosmetic inspection device may generate a report for the user. The image capture device comprises a camera configured to capture images of a device, a processor, and a memory configured to store captured images as well as the scanning logic which controls the camera. The user interface device comprises a processor; memory for storing the testing logic for controlling the image capture, comparison to baseline images, and determination of defective components; and a graphical user interface for displaying output to and collecting input from the user. The image capture device and user interface device communicate through a network interface.

Yet another embodiment provides a system and method for inspecting the external components of electronic devices. The inspection system may be automated to perform the setup, image capture, comparison, ordering of replacement components, and/or perform replacement of defective components without any further user interaction. The user may only be required to place the electronic device on a surface of the inspection system, and the system may grasp and identify the device automatically, and then proceed to perform the rest of the steps. For some commonly defective components, such as display screens or outside cover materials of popular smart phones, the system may automatically replace such defective components from an inventory of replacement parts.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
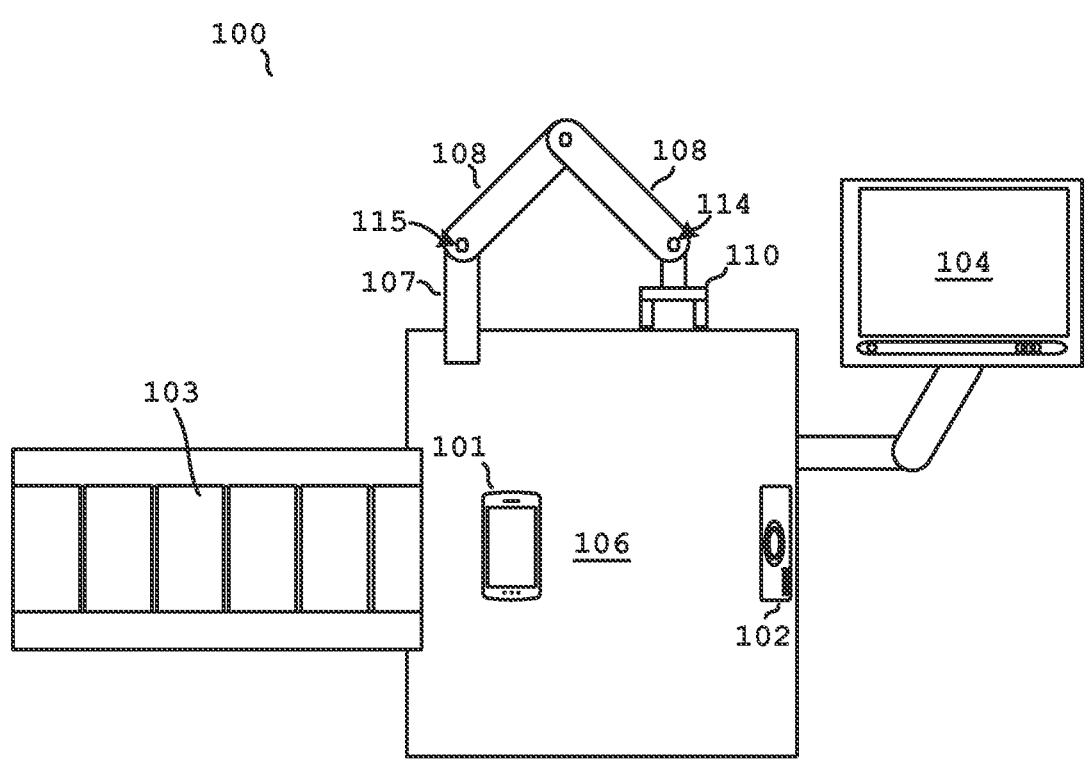
FIG. 1 is a representation of a cosmetic inspection system in accordance with an illustrative embodiment.

The illustrative embodiments provide a system, device, and method for imaging and detecting defective components of electronic devices. Images of electronic devices are captured in order to determine which, if any, components of the devices are defective. Defects may include non-fulfillment of requirements related to an intended or specific use of the electronic device. Defects may be broadly defined by the applicable parties and are typically associated with a particular action. In one embodiment, images of a number of electronic devices may be captured from a number of different angles or based on movement of the electronic devices to thoroughly verify the state of the electronic devices. Any number of systems or methods may be utilized to orient and position each electronic device and capture the required images. The system may determine which, if any, replacement components of the electronic devices are needed in response to the captured images. Criteria, preferences, or logic may be utilized to determine what, if any, actions are taken for each of the electronic devices. For example, criteria may specify what defects need to be addressed and those that may be ignored.

The user may also implement cleaning, buffing, and/or polishing. A user of the system may be provided with options for ordering such replacement components, which may greatly streamline the diagnostic, cleaning, and repair work stream. In another embodiment, the system may be integrated with an inventory or warehouse management system for automatically procuring the necessary components in advance to further streamline the process.

Electronic devices may include computing and telecommunications devices, including cell phones, PDAs, smart phones, media players, e-readers, tablets, mobile computers, set-top boxes, gaming devices, and other forms of personal or consumer electronic devices. Components of the electronic devices may include, but are not limited to, external casing materials, touch screens, switches, batteries, buttons, a keyboard or individual keys of a keyboard, track balls, interface components, and input/output jacks for connections to other devices. Components that are referred to as "defective" may include, but are not limited to, components that are smashed, scratched, bubbled, speckled, dented, dinged, pitted, discolored, dirty, cracked, chipped, faded, deteriorated, malfunctioning, worn out, or unusable in any other fashion. The cosmetic inspection system may also detect for materials, such as hair, fingerprints, dirt, debris, makeup, tape, adhesives, and so forth. The definitions and criteria for defects may be pre-determined.

These non-limiting embodiments are described in sufficient detail to enable those skilled in the art to practice the invention, and it is understood that other embodiments may be utilized and that logical structural, mechanical, and electrical changes may be made without departing from the scope of the invention. The illustrative embodiments may allow automatic or systematic cosmetic inspection and analysis of electronic devices to be performed. As a result, individual users do not have to subjectively inspect each electronic device in a way that may be inconsistent and difficult to repeat. The cosmetic inspection system may be configured to view small imperfections only visible to an automated system or trained eye as well as obvious imperfections that require some sort of action, such as cleaning, repair, replacement, or recycling. The cosmetic inspection system may define maximum sizes and quantities of defects on different services of the electronic device.

FIG. 1 is a pictorial representation of a cosmetic inspection system 100 in accordance with an illustrative embodiment. The cosmetic inspection system 100 is an electronic system for determining defects in individual electronic devices, such as the electronic device 101.

In one embodiment, the cosmetic inspection system 100 may be a stand-alone device. In another embodiment, the cosmetic inspection system 100 may be integrated with a warehouse management system, inventory system, or other processing system. For example, electronic devices may be moved to the cosmetic inspection system 100 by any number of slides, drops, rollers, robotic systems, trams, or so forth. For example, the cosmetic inspection system 100 may include rollers 103.

In one embodiment, the cosmetic inspection system 100 may include an image capture unit 102 and a user interface 104. The image capture unit 102 is designed for capturing images of the electronic device 101 to identify individual components of the electronic device. The image capture unit 102 may include one or more cameras or imaging devices placed at edges, below, or above the base 106. For example, the image capture unit 102 may be a camera array configured to quickly take pictures of the front, sides, back, and other portions of the electronic device 101. In one embodiment, service classifications may include primary surfaces exposed to direct close-up view during ordinary operation of the electronic device 101 (e.g. display, camera, etc.), primary surfaces exposed to direct view in ordinary use (e.g. keypads, housing lens area, labels, logos, etc.), side surfaces including rounded transitional edges of the front side to the side housing, secondary surfaces exposed but not in direct view during ordinary use (e.g exposed portions of assembly screws, back covers, battery covers, connector plugs, etc.), and non-exposed services (e.g. Label or logo placement areas, inner surface of battery cover, etc.). The images may be captured simultaneously, concurrently, or sequentially based on the positioning of the electronic device 101.

The image capture unit 102 may include a base 106 for supporting the weight and/or position of the cosmetic inspection system 100. The rollers 103 may be configured to move the electronic device 101 to the base 106 for analysis.

In one embodiment, the base 106 may be comprised of a non-reflective surface material, which may be better suited as background material for images of the device that are taken from above or any side angles. The base 106 may be a conveyor, slide, or shaker configured to move the electronic device 101 at a predetermined rate across the base 106. For example, the base 106 may slowly move the electronic device from one end to another.

In another embodiment, the base 106 may be transparent and include one or more portions of the image capture unit 102 positioned below the base 106 for taking pictures from below without repositioning the electronic device 101. The image capture unit 102 may also be configured to move, rotate, swivel, zoom, or adjust to the size, shape, and position of the electronic device 101. The image capture unit 102 may include both standard viewing systems, zoomed viewing systems, and so forth. In one embodiment, the image capture unit 102 may be attached to or integrated with a gripping unit 110.

The cosmetic inspection system 100 may also include a gripping unit arm 107, which may be fixed or adjustable, which supports the gripping unit 110 for supporting and positioning the electronic device to be imaged. The gripping unit 110 may be comprised of any type of arms 107 and 108 that are configured to grasp and support the weight of the electronic devices to be inspected by the image capture unit 102. In some embodiments, the gripping unit 110 may have relatively long, flat surfaces, for distributing the weight of devices such as set-top boxes or tablets to prevent causing damage due to excessive pressure being applied to one location of the device. In one embodiment, the gripping unit 110 may include pinchers, fingers, jamming grippers, friction grips, encompassing grips, arms, robotic hands, suction systems, or so forth for moving, positioning, or securing the electronic device 101.

In one embodiment, the gripping unit arm 107 may be a support arm and the gripping unit arm 108 may allow for increased positioning flexibility of the gripping unit 110 as described below. In one embodiment, the gripping unit 110 may be affixed to the gripping unit arm 108 using an adjustable joint 114 configured to tilt and rotate the gripping unit 110 in a wide variety of positions to allow for the electronic device 101 to be imaged from multiple perspectives. The gripping unit arm 108 may be connected to the gripping unit arm 107 using an adjustable joint 115. The position of the gripping unit arm 107 may also be adjusted with respect to the base 106 using any number of slidable or pivotable connectors (not shown).

In one embodiment, the gripping unit arm 108 may telescope or include a support arm extension, allowing for the distance between the gripping unit 110 and the base 106 to be adjusted. The gripping unit arm 108 may also include a positioning arm extension, which allows for the position of the gripping unit 110 to be adjusted.

In one embodiment, the cosmetic inspection system 100 may utilize the gripping unit 110 to position the electronic device 101 for capturing one or more images utilizing the image capture unit 102. In another embodiment, the cosmetic inspection system 100 may utilize the gripping unit 110 to position the electronic device 101 in various positions relative to the image capture unit 102 to capture the desired images.

In one embodiment, the cosmetic inspection system 100 may utilize the image capture unit 102 to determine the orientation of the electronic device 101, and based on the orientation, move and position the electronic device 101 relative to image capture unit 102 for capturing necessary images. The cosmetic inspection system 100 may include criteria including grip strength, positioning, image type, and so forth. The image capture unit 102 may also be utilized to determine identifying information about the electronic device 101 by reading or scanning barcodes, radio frequency identification tags, serial numbers, or other identifiers on, integrated with, or attached to the electronic device 101 to identify the associated communications service provider, original equipment manufacturer (OEM), or other related party.

In one embodiment, the inspection criteria or logic utilized by the cosmetic inspection system 100 may be set based on the identifying information. The cosmetic inspection system 100 may include one or more processors, memories, and databases for identifying the make and model of electronic device and standards utilized to analyze the electronic device 101.

The cosmetic inspection system 100 may include any number of states that may be utilized before, during, or after testing the electronic device 101. For example, the gripping unit 110 and the gripping unit arms 107 and 108 may be moved to default positions before retrieving or moving the electronic device 101. In one embodiment, the automatic inspection system 100 may utilize criteria regarding the make and model to position the electronic device 101. In other embodiments, the user may provide feedback, instructions, or other input through the user interface 104.

The image capture unit 102 may also include one or more camera support arms (not shown), which may be fixed or adjustable, and may be used to suspend a camera to capture still or video images of the electronic device 101. The camera arms may include a camera tilt joint used for connecting the camera to the camera arms. The camera tilt joint may allow for the camera to be tilted or swiveled in multiple angles for capturing various images of the electronic device to be imaged. The camera may be moved, positioned, and angled as has been described for the gripping unit 110.

The image capture unit 102 (e.g. cameras, camera array, etc.) may include a zoom feature that may allow the camera to capture various images of electronic devices without having to be physically repositioned. The image capture unit 102 may also include imaging devices that are flush or nearly flush with the base 106 for capturing images of the edges of the electronic device 101. The base 106 may also include a swiveling portion (not shown) for rotating the electronic device 101 for imaging by the image capture unit 102.

Once the image capture unit 102 has begun to capture images of the electronic device 101, the gripping arms 107 and 108 may automatically move the gripping unit 110 for repositioning the electronic device 101 to the various positions necessary for capturing the required images. The repositioning adjustments may also be performed manually by the user using the adjustable joints 114 and 115. In yet another embodiment, the image capture unit 102 may automatically adjust the position of the gripping arms 107 and 108 and the gripping unit 110 based on the user's input to the cosmetic inspection system 100 through the user interface 104.

In one embodiment, the image capture unit 102 may also include a portable camera, configured to allow a user to manually capture images of the electronic device 101. This portable camera may be especially useful for recapturing images of components of the electronic device 101 that may be obstructed by the gripping unit 110 during the initial image capture.

In one embodiment, the cosmetic inspection system 100 may also include a network interface for communicating with the user interface 104 of the cosmetic inspection system 100. The user interface 104 may provide the user of the cosmetic inspection system 100 with a point of receiving information as well as a point of selecting options for operating the device. The user interface 104 may include the network interface for exchanging information with the cosmetic inspection system 100 including the image capture unit 102. The user interface 104 may include or utilize a graphical user interface (GUI) for displaying information to the user as well as collecting user inputs. In one embodiment, the GUI may take the form of a touch-screen display. The user interface 104 may communicate with the other components of the cosmetic inspection system 100 directly or indirectly through a wired connection (e.g. USB, Firewire, Apple connector, etc.) or through a wireless connection (e.g. Bluetooth, WiFi, etc.).

In one embodiment, the user interface 104 represents a dedicated or stand-alone communications or computing device that interacts with cosmetic inspection system 100. For example, the user interface 104 may be removed so that the user may move around or adjust the cosmetic inspection system 100 as may be needed. In one embodiment, the cosmetic inspection system 100 may include or communicate with a database that includes visual quality standards and inspection guidelines for any number of designated parties (e.g. manufacturers, communications service providers, logistics providers, etc.).

Although not shown, the cosmetic inspection system 100 may be integrated with other rollers, collectors, bins, shoots, conveyors, or so forth for processing the electronic device 101 once inspected. The cosmetic inspection system 100 may also include a marker configured to mark, point out, or designate defects on the electronic device 101. For example, the cosmetic inspection system 100 may mark defects with a marker or removable paint utilizing the robotic or automatic systems described. The markings may be utilized to claim, repair, or replace components of the electronic device 101. In one embodiment, the inspection and analysis of the electronic device 101 may be performed in seconds or less.

The cosmetic inspection system 100 may also include any number of lights configured to illuminate the electronic device 101 at designated levels. In one embodiment, the cosmetic inspection system 100 may utilize various spectrums, wavelength, and frequencies of light or other radio frequencies to visualize the electronic device 101. The cosmetic inspection system 100 may also utilize imaging systems, such as infrared, ultraviolet, x-ray, or so forth. The cosmetic inspection system 100 may adapt the lighting or illumination to designated standards associated with the electronic device or relevant party/customer.

Figure 2:
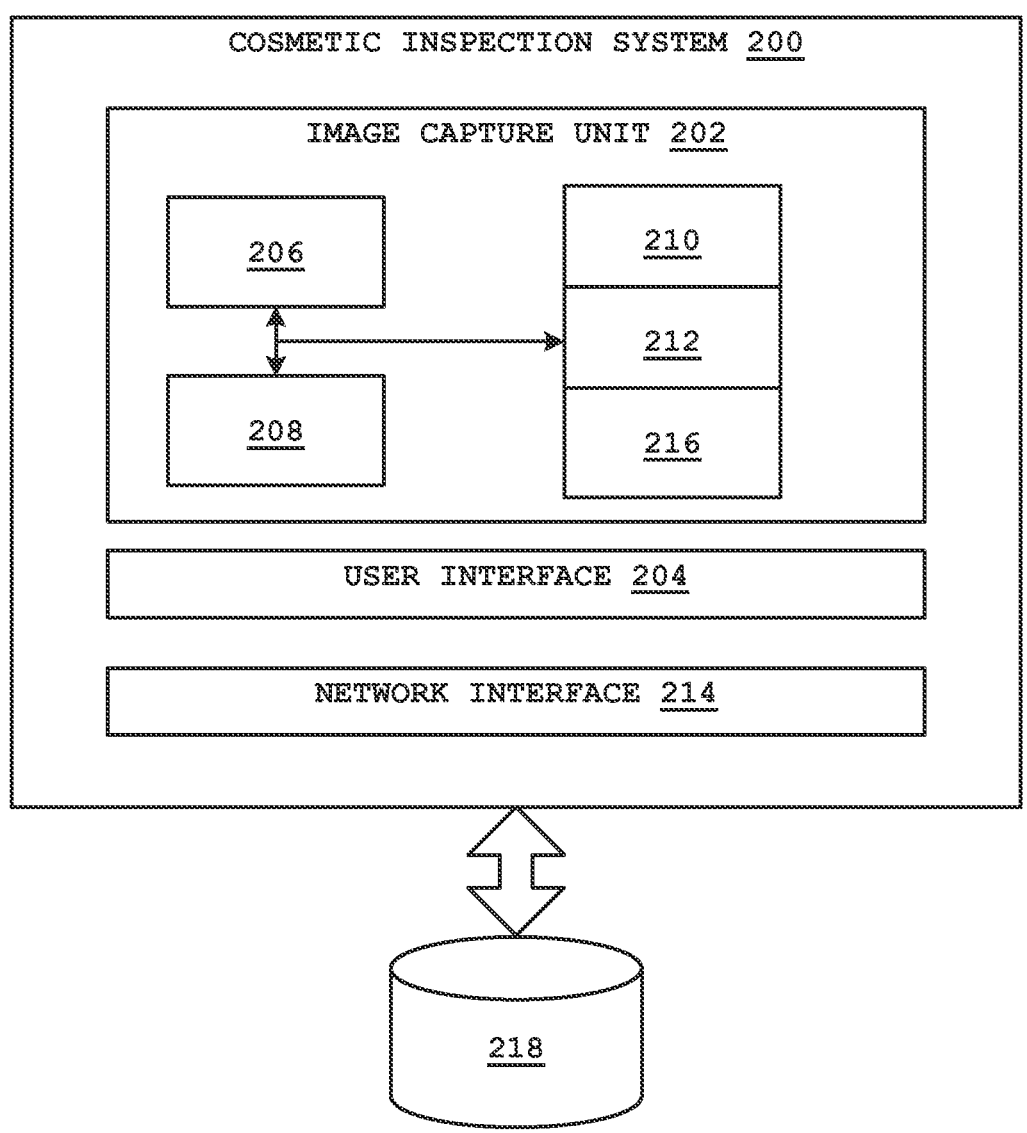
FIG. 2 is a block diagram of a cosmetic inspection system in accordance with an illustrative embodiment.

FIG. 2 is a block diagram of a cosmetic inspection system 200 in accordance with an illustrative embodiment. The cosmetic inspection system 200 may include any number of computing and communications elements including hardware, software, and peripherals that are not specifically shown, such as circuits, motherboards, adapters, displays, converters, circuits, logic, ports, adapters, and other similar elements.

In one embodiment, the cosmetic inspection system 200 may include an image capture unit 202 and a user interface 204. The image capture unit 202 may include a processor 206, a memory 208, cameras 210, and a gripping unit 212. The processor 206 is circuitry or logic enabled to control execution of a set of instructions. The memory 208 is a hardware element, device, or recording media configured to store data or software for subsequent retrieval or access at a later time. The cosmetic inspection system 200 may also include a network interface 214. The network interface 214 is an interface for communication between components of the cosmetic inspection system 200 as well as one or more external networks, components, devices, systems, or equipment.

The cameras 210 are configured to capture still or video images of an electronic device and may include logic 216 for controlling the image capture of the electronic device. The logic 216 may be configured to automatically capture images of specific views, angles, positions, or components associated with a particular electronic device (or based on instructions from a user). The logic 216 may then translate these instructions into directions for the cameras 210 to capture images of the appropriate dimensions for the specific components.

The gripping unit 212 may be configured to adjust the position of the electronic device to be imaged and may utilize the logic 216 for controlling how the gripping unit arm 212 adjusts the position of the electronic device. The logic 216 may be configured to adjust the height of the gripping unit 110 above the base 106 of the image capture unit 200 and the position of the gripping unit 110 in the x or y direction above the base 106. The logic 216 may be configured to direct the gripping unit arm 212 to reposition the electronic device to be imaged before, in between, or following each of a series of still-capture images of the electronic device. In another embodiment, the logic 216 may direct the gripping unit arm 212 to reposition the electronic device to be imaged in a continuous motion for video capture by the camera 210.

In another embodiment, the user interface 204 may also include a processor, a memory, a testing control unit, a GUI, and a network interface. For example, the user interface 204 may be a desktop computer or laptop. In another embodiment, the user interface 204 may be a tablet computer that may be either fixed to a stand unit, or designed to be portable, allowing the user of the cosmetic inspection system 200 to easily move or carry around the user interface 204 while operating the cosmetic inspection system 200. In yet another embodiment, the user interface 204 may be a display unit that is fixed to the image capture unit 202, but may also be portable, allowing for ease of use while operating the image capture unit 202. In any of the embodiments, the user interface 204 may communicate with the image capture unit 202 either through a wired or wireless network interface 228. The GUI may be a web-based or application based display medium configured to display information to the user or collect user input.

The image capture unit 202 may also act as a testing control unit or management center for processing each of the imaged electronic devices. In one embodiment, the memory 208 may include or communicate with a parts database or warehouse management system including information relevant to the electronic devices that are inspected. The logic 216 may store a set of instructions relevant to completing an inspection of an electronic device. Based on the selection of a particular electronic device by the user or image recognition performed by the image capture unit 202, the logic 216 may be configured to determine the set of images to be captured for that particular device. Testing logic may be included in logic 216. The testing logic may use information relevant to the particular electronic device, communications service provider, or OEM that is stored in the database of the memory 208 for making such determinations.

The database of the memory 208 may also supply the proper baseline images for components of devices that may be used for comparison with the captured images of the device being inspected. This comparison may be performed by the logic 216 for determining whether there are any defective components of the device being inspected. Determinations may also be made indicating whether the electronic device needs to be polished or buffed. Baseline or golden images may include a set of images that correspond to each component in its form according to the manufacturer's design or specification. For example, baseline images for a set-top box may include, but are not necessarily limited to, a baseline image of each side of the external case (including top, bottom, and edges), a baseline image for any display units on the set-top box, a baseline image for each group of controls, including switches and buttons, and a baseline image for each group of connectors or ports.

Once the logic 216 has determined the necessary images to be captured for the particular electronic device, the logic 216 may generate a set of instructions for capturing the images and communicate these instructions to the image capture unit 202. The logic 216 may then make determinations of whether there are any defective components of the electronic device being inspected. The logic 216 may make such determinations by comparing the images captured by the image capture unit 202 of the device being inspected to a set of baseline images for the components of the particular device. Based on this comparison, the testing logic 230 may determine whether a component of the device being inspected meets a pre-set threshold level of quality in order to determine whether that particular component is to be classified as defective. In response to classifying a component as defective, the logic 216 may flag the image of the defective component to be highlighted in a report for the user. The memory 208 may store reports and statistics regarding defective components of all of the electronic devices tested by the cosmetic inspection system 200.

In one embodiment, the logic 216 may also be configured to search the memory 208 to look up any part identification numbers or codes associated with the particular defective component of the electronic device. As previously described, the cosmetic inspection system 200 may utilize the image capture unit 202 or a separate scanner to determine the identifiers of the electronic devices. These part numbers may also be included in a report to the user and associated with the specified actions, such as an inventory order for a specific component, cleaning action, or so forth.

In one embodiment, the cosmetic inspection system 200 may automatically replace a defective component of an electronic device without further user interaction. The cosmetic inspection system 200 may be configured with an inventory of replacement parts (not shown) for common defective components of popular electronic devices. For example, the cosmetic inspection system 200 may have a supply of display screens and external casing materials for popular smart phones, e-readers, tablets, or other computing or communications devices. For example, upon comparison to the baseline images to the captured images, the cosmetic inspection system 200 may identify that a display screen of a smart phone is defective. As a result, the cosmetic inspection system 200 may note the defect in a report for the user and proceed to automatically installing a replacement screen from its inventory or move the electronic device to a designated area and direct a user or technician to perform the replacement. The cosmetic inspection system 200 may also be configured to prompt the user to accept the proposed replacement component before the system actually performs the replacement.

The user interface 204 may include, but is not limited to, a touch-screen display, keyboard and mouse, voice interface, or button controls that allow the user to provide inputs directly or indirectly through the display screen or other component of the user interface 204. In another embodiment, the user interface module may be a desktop or laptop computer.

The cosmetic inspection system 200 may be connected to external sources of information relevant to the electronic devices inspected by the cosmetic inspection system 200. Such external information sources may communicate with the user interface 204 through the network interface 214 and may include an external product database, which may include information that is not stored in the database of the cosmetic inspection system 200. Such information may include, but is not limited to, additional specifications or baseline images for electronic devices and/or components of the electronic devices, as well as possible alternative replacement components for the electronic devices. The external product database may also include device information that is recently published by manufacturers and has not yet been updated to the database of the cosmetic inspection system 200. Additionally, the user interface 204 may be connected through the network interface 214 to an external product network, which may include similar or additional information as the external product database.

Figure 3:
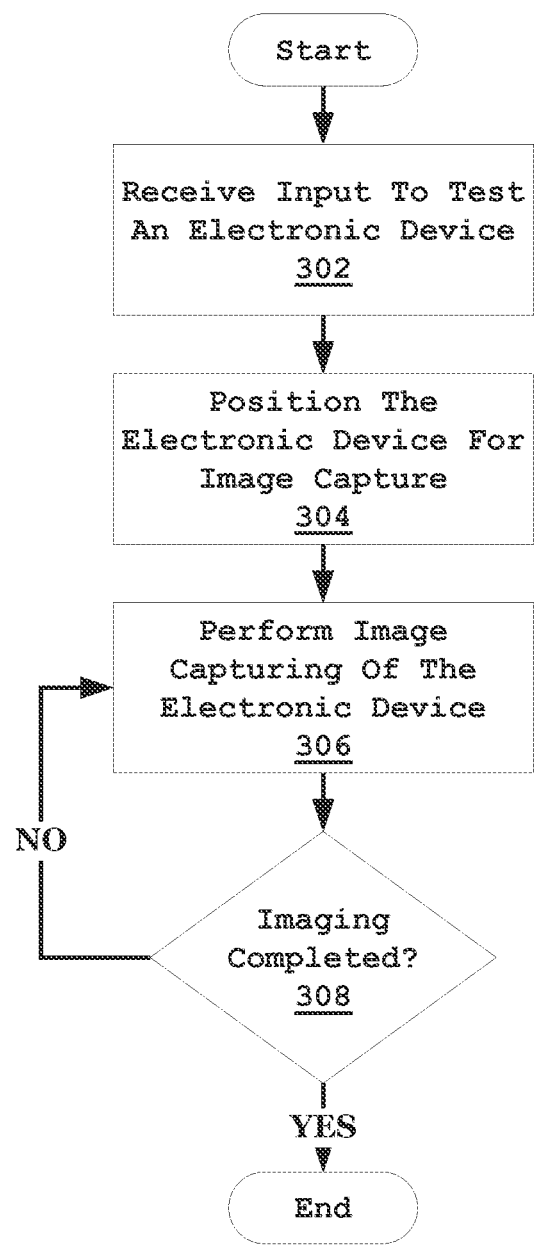
FIG. 3 is a flowchart of a process for capturing images of an electronic device in accordance with an illustrative embodiment.

FIG. 3 is a flowchart of a process for capturing images of an electronic device in accordance with an illustrative embodiment. The process of FIG. 3 may be implemented for a variety of different electronic devices. Referring also to FIG. 2, the process of FIG. 3 begins with the cosmetic inspection system 200 receiving an input to inspect an electronic device (step 302). In one embodiment, the cosmetic inspection system 200 may detect or sense the electronic device is approaching or has reached the cosmetic inspection system 200. For example, the cosmetic inspection system 200 may view the electronic device utilizing the image capture unit 202 or may sense a weight associated with the electronic device. In another embodiment, the input may be in the form of the user selecting a particular electronic device through the user interface 204. In another embodiment, the input may be only in the form of a user selecting an option to begin inspection through the GUI displayed by the user interface 204. The cosmetic inspection system 200 may be configured to automatically determine the identity of the particular electronic device being inspected based on the captured images.

In one embodiment, the testing logic 230 may include algorithms for determining the identity (make and model) of the electronic device based on identifiers (bar codes, serial numbers, logos), identifying attributes (e.g. screen size, button configuration, model identification, etc.), signal characteristics, or other identifying information. The cosmetic inspection system 200 may include an optical scanner, bar code reader, or RFID detection unit configured to communicate with an RFID identification marker on the surface of or within the electronic device. In another embodiment, the identification marker detector may be a Bluetooth interface configured to communicate with a Bluetooth feature of the electronic device to determine its identity.

Next, the cosmetic inspection system 200 may position the electronic device for image capture (step 304). In one embodiment, the cosmetic inspection system 200 may utilize a robotic arm, stops, a rotation table, or other components to move, manipulate, or rotate the electronic device to a desired position and orientation. Under the scenario where the user selects a particular electronic device through the user interface, the user may then receive instructions through the user interface 204 for retrieving or attaching the particular electronic device to the cosmetic inspection system 200. For example, the user may attach the electronic device to the gripping unit 110.

Next, the cosmetic inspection system 200 performs image capturing of the electronic device (step 306). The image capture unit 202 captures the first image of the electronic device in step 306. The camera is instructed to capture the image by the logic 216. The image capture unit 202 may then store the first image of the electronic device in the memory 208. The stored image may be associated with the electronic device, such as a serial number or assigned identification, and then stored in the memory 208, a memory of the user interface 204, or and an external database, system, device, or memory. In one embodiment, the image capture unit 202 may include a camera array configured to take all of the necessary images with minimal electronic device manipulation. The camera array may be fixed or may be moved into position as needed. The cosmetic inspection system 200 may also be configured to move or reconfigure itself to capture the distinct images required for the electronic device.

Next, the cosmetic inspection system 200 determines whether the imaging of the electronic device has been completed (step 308). In one embodiment, the determination is made by the logic 216. For example, the logic 116 may indicate that for particular electronic device associated with Service Provider A, six images of the top, bottom, and sides of the electronic device are required. The service provider may also require close-up images of input ports, keyboards, and front and rear cameras where applicable. If all necessary images of the electronic device have been captured, the image capture process of FIG. 3 ends. If the cosmetic inspection system determines that not all of the images have been captured, the cosmetic inspection system including the gripping or repositioning components may be used to reposition the electronic device into the correct position in order to capture the next image (step 306). Step 306 may be repeated until a determination is made in step 308 that no further images for the particular electronic device are needed or required.

In one embodiment, the logic 216 may determine based on one of the captured images of the electronic device that the gripping unit 110 obstructed a necessary part of the electronic device during the imaging process. In this instance, the logic 216 may provide the user with instructions through the user interface 204 indicating that the electronic device needs to be repositioned (i.e. repositioning of the gripping or securing mechanism and associated electronic device). The instructions from the logic 216 may include specific directions on how to place the electronic device within the cosmetic inspection system 200 so that the missing component or part of the component can be included in a captured image.

In another embodiment, the logic 216 may be configured to automatically coordinate with the image capture unit 202 to reposition the electronic device. For example, the testing logic may determine that one section of the display screen of a smart phone is obstructed by a portion of the cosmetic inspection system 200. The logic 216 may be configured to coordinate the placement of the electronic device on the platform or base and re-grasp the electronic device to capture the necessary image. In one embodiment, the logic 216 may be configured to process two partial images as a complete image of a view of the electronic device.

Figure 4:
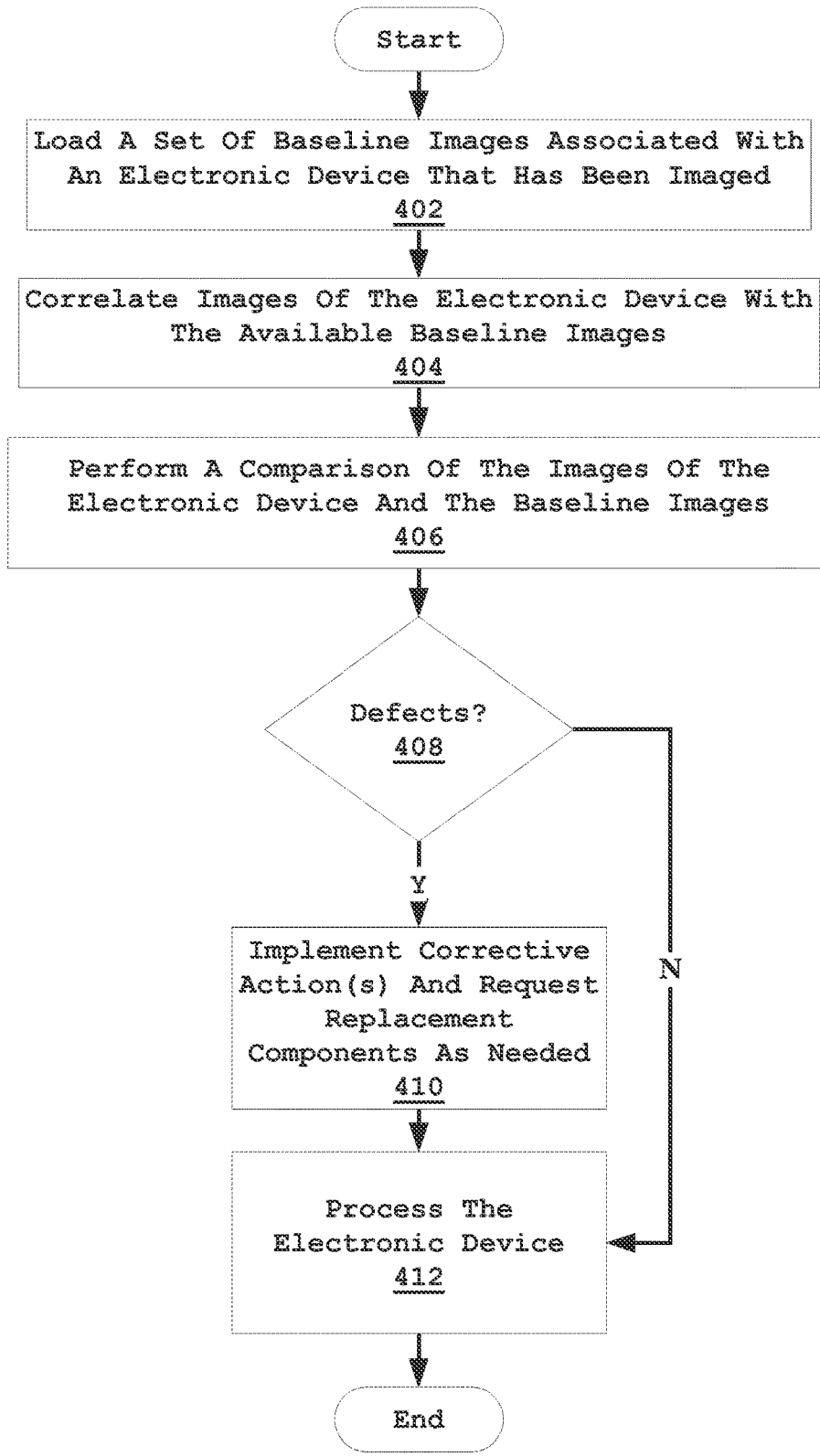
FIG. 4 is a flowchart of a process for comparing captured images of an electronic device against baseline images depicting manufacturers' specifications.

FIG. 4 is a flowchart of one embodiment of a process for processing the images of the electronic device. Referring also to FIG. 2 and FIG. 3, the process of FIG. 4 begins with the cosmetic inspection system 200 loading a set of baseline images associated with the electronic device that has been imaged (step 402). In one embodiment, the correct set of baseline images for the particular electronic device being tested may be determined by the logic 216 in conjunction with the electronic device database in the memory 208. If logic 216 determines that the proper set of baseline images are not present within the memory 208, the logic 216 may initiate communication to locate the baseline images with either an external product database 218 or an external product network using the network interface 214.

Once the set of baseline images have been loaded by the logic 216, the cosmetic inspection system 200 correlates images of the electronic device with the available baseline images (step 404). The images may be correlated utilizing metadata, labels, identifiers, or general structural content. The images may also be correlated utilizing a defined image capture pattern, such as front, bottom, left side, right side, and back.

Next the cosmetic inspection system 200 performs a comparison between the captured images of the electronic device and the baseline images (step 406). In one embodiment, the logic 216 may prepare the captured image and baseline image for comparison. For example, the logic 216 may adjust or zoom into the captured image to an amount that allows the logic 216 to view and compare the captured image and baseline image from the same perspective. The logic 216 may also perform image filtering, scrubbing, noise reduction, color adjustment, and so forth on the images.

Next, the cosmetic inspection system 200 determines whether there are any defects with the electronic device (step 408). During step 408, the cosmetic inspection system 200 may examine each component in the image based on any discrepancies between the captured image and the baseline image. In one embodiment, the baseline image may have a predefined set of criteria associated with different aspects of the electronic device component. For example, the baseline image may be coded for comparing a plurality of points/locations (e.g., twenty different points) on the image to the same points on the captured image. Alternatively, the logic 216 may compare the captured image at a plurality of points to the same points on the baseline image. The logic 216 may note any discrepancies between any of the corresponding points between the captured image and the baseline image.

The logic 216 may also include an algorithm for determining whether the size, shape, and position of the defect merits repair, replacement, user analysis, cleaning, polishing and buffing, or so forth. The cosmetic inspection system 200 may be configured to perform analytic measurements regarding width, depth, and shape of any defects for determining the correction action, ordering parts from inventory, and so forth. The logic 216 may document multiple defect points on the captured image and make one or more predictions on the type of defect. For example, the logic 216 may calculate that several different discrepancies at multiple points on the image of a display screen of a PDA to determine that the display screen is cracked.

In one embodiment, in response to the cosmetic inspection system 200 determining there are differences or discrepancies between the captured image and the baseline image, the logic 216 may flag the areas on the captured image for inclusion in a report provided to the user of the cosmetic inspection system 200. The report may also include the one or more notations regarding the type and severity of defect as discussed above. The threshold quality level may vary for each particular electronic device, OEM, service provider, or component, based on the level of detail, complexity, and precision of the aspects of that component. For example, the logic 216 may be programmed to determine that a small crack on the back casing of a TV set-top box is a minor discrepancy that does not warrant the back casing component to be repaired or designated as needing replacement. On the contrary, a very small crack or hole on a screen of a smart phone may be enough to warrant the screen component being replaced.

In one embodiment, to determine if quality thresholds are satisfied, a numerical rating system may be used to assign a numerical score for each defect found in a captured image. Such a numerical rating system may be handled by the logic 216 and numerical scores for each defect may be included in the report for the user. For example, the logic 216 may be configured with a numerical rating system that assigns a score between one and ten for each defect found on a captured image. For example, a defect on the back case material of a tablet, such as a small crack may be assigned a score of 2, while a large crack that exposes the internal circuitry of the device may be assigned a score of 9. The logic 216 may be configured with pre-set threshold values (e.g. lower, upper, numeric, etc.) for each component of a particular electronic device for determining when a defect warrants replacement of the particular component. In the present example of the back case of a tablet, the logic 216 may be programmed to flag any score under five as acceptable, while any score of five or above warrants a replacement of external casing material. The cosmetic inspection system 200 may also order the replacement external casing material and assign/ship the tablet to a designated repair location. The logic 216 may also be configured to include comments such as "marginally acceptable" for scores that are very close to the threshold value, for instance a four in the present example. Marginally acceptable scores may be flagged for user analysis. For example, the user may be notified in the report that a manual inspection is necessary to determine whether the identified discrepancy is a minor scratch or a crack that might warrant replacement.

Additionally, the logic 216 may be configured with algorithms for determining if a particular identified defect of a device component in a captured image warrants replacement of the entire electronic device or sub-components. For example, such a defect may be a smashed external switch that is a non-separable part of the main circuit board of a media player. The logic 216 may be programmed to flag such a defect as irreparable and note that a replacement electronic device or main circuit board is necessary.

If the cosmetic inspection system 200 determines there are defects in the electronic device in step 408 (e.g. an inspected component does not meet an associated quality threshold level), the cosmetic inspection system may implement a corrective action for the defect and request components as needed (step 410). For example, the logic 216 may be configured to determine and record the defect and the part number associated with the defective component. This defect information, along with the flagged discrepancy on the image and defect, may be included in stored information or a final report to the user if utilized. Additionally, the logic 216 may coordinate with the memory 208, database 218, or external product information sources (e.g. communications service provider databases, OEM databases, product networks, etc.) to recommend an order code for a replacement component if necessary in step 410.

If the cosmetic inspection system 200 determines there are no defects in the electronic device during step 408, the cosmetic inspection system 200 further processes the electronic device (step 412). In one embodiment, the cosmetic inspection system 200 may pass the electronic device off to a warehouse management system for flashing, clearing, software updates, and so forth before redistributing the electronic device. The cosmetic inspection system 200 may also be configured to electronically transfer records associated with the electronic device to separate devices and systems in a handoff of tracking and responsibility.

Figure 5:
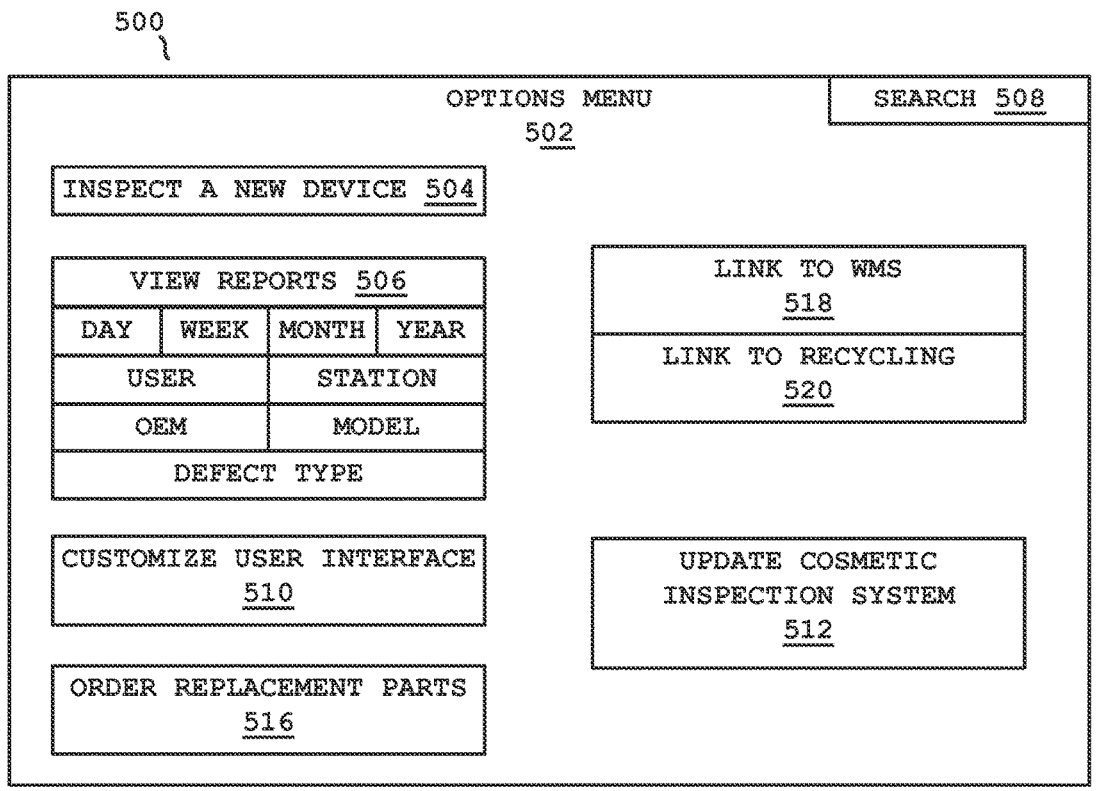
FIG. 5 is a representation of a user interface used for displaying information to the user such as captured images of the electronic device and collecting input from the user such as selection of a particular electronic device model or other system features.

FIG. 5 shows a block diagram of a graphical user interface (GUI) 500 in accordance with an illustrative embodiment. The GUI 500 may include any number of buttons, icons, scroll bars, windows, sections, or scroll wheels. In one embodiment, the GUI 500 may be presented by a user interface, such as a touch-screen display unit.

In one embodiment, the GUI 500 may present the user with a menu of options 502 for controlling the cosmetic inspection system 200. In one embodiment, the options 502 may include, inspecting a new device 504, viewing reports 506 for electronic devices that have been inspected by the cosmetic inspection system, searching for electronic device information 508, customizing the user interface 510, or updating the cosmetic inspection system 512.

In response to a user selection to inspect a new device 504, the GUI 500 may present the user with a set of instructions related to inspection of the electronic device. For example, the cosmetic inspection system may be configured to move and secure the electronic device in a particular way, capture specific images, manage system configuration, configuration of the cosmetic inspection system, and other settings. Instructions may also include directions for the user to capture specific images using a portable camera. Once the setup instructions have been executed by the user, the user may be prompted by the GUI 500 to select a start button, at which point the cosmetic inspection device may complete the procedures for capturing the images of the electronic device.

If the user selects to view inspection reports 506, the GUI 500 may present the user with a list or index of reports for electronic devices that have previously been inspected. The user may then navigate this index in order to select the desired prior inspection report by criteria, such as day, month, year, user, test station, make, model, communications service provider, supplier, defect type, defect severity, or so forth. The user may use information from prior reports for electronic devices that sustained similar defects and review replacement parts furnished for these devices.

In response to a user selection to search electronic device information 508, the user may be presented with a set of search options. Search options may include searching for a specific device and/or components related to that device. Another search option may be to search for devices similar to the specific electronic device and/or devices that share compatible parts. The user may also be given a set of options to search a device database of the cosmetic inspection device. As a result, the user may then be able to directly order parts or direct parts from available inventories through a series of ordering options presented on the GUI 500.

The user may also be able to customize the GUI 500 of the cosmetic inspection system 510. The user may also periodically choose to update the cosmetic inspection system 512 as shown in the option for system updates. Such updates may include, but are not limited to, updating the device database with additional product information.

The GUI 500 may also present the user with an area for displaying captured images and/or information relating to the electronic device being inspected. Portions of the GUI 500 may also be used to display information selected by one of the options from the options menu 502. In one embodiment, a series of option buttons may be presented for actions relating to the inspected images. Such options may include printing or emailing a summary report of the findings associated with the image processing for the specific electronic device(s). Other options may include ordering replacement parts 516, linking to a warehouse management system 518, linking to a recycling system 520, ordering a replacement electronic device, or other processing options.

In other embodiments, the GUI 500 may present options for imaging and analyzing electronic device(s). For example, the options menu 502 may present images of devices and components for facilitating the actions of the user. As previously described the cosmetic inspection system 200 may automatically identify the electronic device (make and model) based on images captured by the image capture unit. In another embodiment, the user may enter information in the user interface about the electronic device such as manufacturer, model, the version, and any other pertinent options or feature information useful for identifying the electronic device. Yet another embodiment identifies the electronic device by allowing the user to browse for the electronic device in a series of drop-down menus, including fields such as manufacturer, model name or number, version number, other distinguishing features or options, or any other pertinent information related to the electronic device.

The GUI 500 may also present the user with multiple options for capturing the images of the electronic device. For example, the cosmetic inspection system may automatically capture a set of images predetermined by the identity of the electronic device. For example, the GUI may implement instructions for capturing a predetermined set of images for a specific electronic device. Another embodiment may allow a user to select the components of the electronic device to be imaged. For example, the user may select to capture only a single image for all sides of the electronic device. The user may also select components to be imaged or manually manipulate the electronic or robotic portions of the cosmetic inspection system.

In another embodiment, the GUI 500 may display comparative images of the electronic device and baseline images and the automated process is implemented. For example, the determinations made by the automated process may require user review and approval before being finalized. The captured images and the determined assessment or actions may be communicated to the user. The GUI 500 may also display information related to the defective component(s) of the electronic device, including, but not limited to, the specific part name and/or number, a defect associated with the part as identified from the captured image, and a recommendation or action item for addressing the defect.

The GUI 500 may also present options for repair rather than replacement, visual ordering or inventory systems, and second opinions performed in near real-time.

Figure 6:
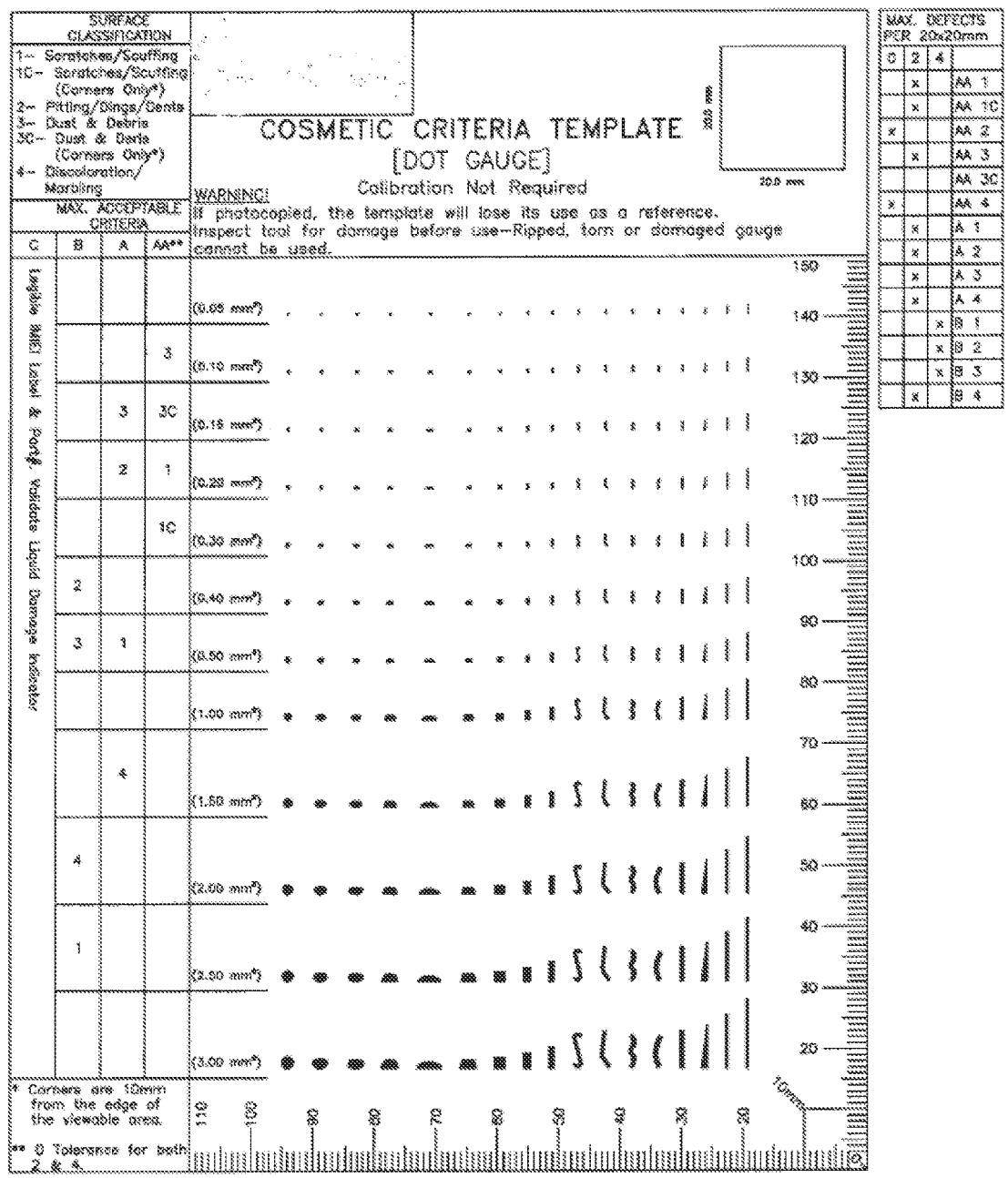
FIG. 6 is a representation of exemplary screenshots from the display unit of the user interface.

FIG. 6 is a representation of cosmetic criteria in accordance with an illustrative embodiment. The cosmetic criteria provide information regarding defect sizes and classifications. In one embodiment, the cosmetic criteria may specify the maximum defects per a designated square area on the electronic device. The cosmetic criteria may also classify types of cosmetic defects, such as scratches, scuffing, pitting, dings, dance, dust, discoloration, and so forth. For example, scratches may be defined as surface imperfections due to abrasion resulting in removal of small amounts of material. The cosmetic inspection system may be configured to determine depth of the scratches utilizing the applicable imaging system. The cosmetic criteria may set surface classifications for each electronic device. In one embodiment, the cosmetic criteria may also be referred to as an inspection template, a estimation chart, or a dot gauge.

The defect may be automatically classified by the cosmetic inspection system utilizing the cosmetic criteria. For example, the cosmetic criteria may be utilized as an electronic template and resource available to the user. The cosmetic inspection system may be configured to image portions of the electronic device and corresponding defects. The images may be utilized to determine the size and shape of the defects utilizing logic and algorithms (e.g. device position, zoom, surface refraction/reflection, image distances, etc.). The cosmetic criteria may set the maximum acceptable criteria for each of a number of electronic devices. The guidelines, thresholds, and maximum acceptable criteria may vary based on the manufacturer, communications service provider, logistics provider, or other involved parties. For example, the maximum acceptable criteria may specify a maximum number of defects as well as a maximum size for each of the defects. In one embodiment, if a defect exceeds a certain size, the component of the electronic device may be recorded and noted for repair. In another embodiment, if a number of defects exceeds a specified threshold, such as three defects within 20 square millimeters, the component may be marked for repair or replacement.

In one embodiment, the cosmetic criteria may specify whether a repair, replacement, or cleaning is prescribed for the electronic device. As a result, the cosmetic inspection system may automatically image, classify, route, and order components for each of the electronic devices. Therefore, time and expense to repair the electronic devices is significantly decreased. In addition, the cosmetic inspection system may be configured to determine allowable cosmetic defects which do not affect customer utilization of the electronic device or are not categorized as unacceptable. In one embodiment, the cosmetic inspection system may be configured to ignore imperfections that may not be readily visible or noticed by a casual observer and reject any defect that quickly captures the attention of a casual observer. The cosmetic criteria may be displayed by the cosmetic inspection system and linked with instructions, images, instructional videos, audio messages, alerts, or so forth for both informing the user/operator and providing guidance for performing the processing as herein described.

In one embodiment, the cosmetic criteria may be utilized to generate reports for batches or individual electronic devices indicating information, such as total units inspected, defects reported, defects missed by a user but determined by the cosmetic inspection system, number of defects reported by a user but determined by the cosmetic inspection system as non-defects, verified defects, and so forth. The cosmetic inspection system may be utilized with or without manual user inspections to perform verification, quality control or the entire inspection process.

Although the present invention and its advantages have been disclosed in the context of certain illustrative, non-limiting embodiments, it should be understood that various changes, substitutions, permutations, and alterations can be made without departing from the scope of the invention as defined by the appended claims. It will be appreciated that any feature that is described in connection to any one embodiment may also be applicable to any other embodiment.

It will be understood that the benefits and advantages described above may relate to one embodiment or may relate to several embodiments. It will further be understood that reference to "an" item refers to one or more of those items.

The steps of the methods described herein may be carried out in any suitable order or simultaneous where appropriate. Where appropriate, aspects of any of the examples described above may be combined with aspects of any of the other examples described to form further examples having comparable or different properties and addressing the same or different problems.

It will be understood that the above description of the embodiments is given by way of example only and that various modifications may be made by those skilled in the art. The above specification, examples, and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the scope of the claims.

What is claimed:

1. An image capture unit device configured to capture images of an electronic device, the image capture unit device comprising:
    a camera configured to capture still or video images of the electronic device
    a processor for controlling the camera and processing of images;
    a control arm configured to grip the electronic device to be imaged and rotate the electronic device in at least one direction to allow multiple surfaces of the electronic device to be imaged;
    a control arm logic for directing the control arm to move the electronic device to be imaged from multiple views and angles; and
    a memory for storing captured images and storing camera control logic, wherein the camera control logic comprises instructions that in operation cause the processor to:
        receive instructions to capture images of specified dimensions associated with the electronic device;
        direct the camera to capture images according to the specified dimensions;
        determine if a portion of the electronic device is obstructed in the captured images;
        if obstruction is determined to be present, coordinate placement of the electronic device and re-grasp the electronic device to capture additional, unobstructed images;
        identify components of the electronic device utilizing the captured images;
        compare component images of the identified components of the electronic device with baseline images associated with each of the identified components; and
        display information regarding the comparison of the images of the electronic device to a user, wherein the information comprises an indication of a defective component of the identified components of the electronic device and a recommendation to repair the defective component based on a comparison of the component images with the baseline images.

2. The image capture unit device according to claim 1, further comprising:
    a platform for supporting the device to be imaged.

3. The image capture unit device according to claim 1, further comprising:
    a network interface for exchanging data from the image capture unit device with an external control device.

4. A user interface device configured to control an image capture unit device, the user interface device comprising:
    a processor for controlling:
        user-selected input;
        at least one of a capture, processing, comparison, and storage of images; and
        a display of device information to a user, wherein the device information includes images of device components;
    a memory for storing images and testing logic, the memory including a plurality of partitions for testing a plurality of electronic devices from a plurality of original equipment manufacturers (OEMs), wherein the testing logic comprises instructions that in operation cause the processor to:
        receive a selection of an OEM and model associated with an electronic device from the plurality of OEMs,
        complete an image capture of the electronic device in response to a user selection of an electronic device model,
        identify the components of the electronic device utilizing the captured images of the electronic device,
        compare component images of the identified components of the electronic device with baseline images associated with each of the identified components,
        display output, wherein the output includes a determination of at least one defective component and at least one recommendation based on the determination of the at least one defective component, wherein the at least one recommendation comprises a recommendation to replace the at least one defective component based on a comparison of the component images with the baseline images,
        prompt the user to accept the replacement recommendation, and
        if the user accepts the replacement recommendation, initiate replacement of the defective component with a replacement component from an inventory of replacement components;
    a graphical user interface for displaying the output and for receiving user input about the imaged device; and
    a network interface for exchanging data with the image capture unit device.

5. The user interface device according to claim 4, wherein the user interface device is configured to determine or at least one defect of the entire electronic device and display the determination to the user.

6. The user interface device according to claim 4, further comprising:
    a second network interface for exchanging data related to electronic devices with external product databases and product networks.

7. A system for capturing and assessing images of an electronic device, the system comprising:
    a camera configured to capture images of an electronic device with defective components;
    a control arm configured to grip the electronic device to be imaged and rotate the electronic device in at least one direction to allow multiple surfaces of the electronic device to be imaged;
    a control arm logic for directing the control arm to move the electronic device to be imaged from multiple views and angles;
    a display device that in operation controls the capture of images by the camera and in operation:
        determines if a portion of the electronic device is obstructed in the captured images;
        if obstruction is determined to be present, coordinates placement of the electronic device and re-grasps the electronic device to capture additional, unobstructed images;
        identifies components of the electronic device utilizing the captured images;

compares component images of the identified components of the electronic device with baseline images associated with each of the identified components;

displays information to a user regarding the comparison of the images of the electronic device, wherein the information comprises an indication of a defective component of the identified components of the electronic device and a recommendation to address the defective component based on a comparison of the component images with the baseline images; and orders a replacement part to replace the defective component.

8. The system according to claim 7, wherein the display device is operable to determine that the defective component of the electronic device is repairable.

9. The system according to claim 7, wherein the display device is operable to use the captured image of the electronic device to identify the replacement part for the defective component.

* * * * *